(12) United States Patent
Sicconi et al.

(10) Patent No.: US 11,772,674 B2
(45) Date of Patent: Oct. 3, 2023

(54) SYSTEMS AND METHODS FOR INCREASING THE SAFETY OF VOICE CONVERSATIONS BETWEEN DRIVERS AND REMOTE PARTIES

(71) Applicant: TeleLingo LLC, Purdys, NY (US)

(72) Inventors: Roberto Valter Sicconi, Danbury, CT (US); Malgorzata Elzbieta Stys, Purdys, NY (US); Cesar Gonzales, Katonah, NY (US)

(73) Assignee: TeleLingo LLC, Purdys, NY (US)

( * ) Notice: Subject to any disclaimer, the term of this patent is extended or adjusted under 35 U.S.C. 154(b) by 0 days.

(21) Appl. No.: 17/835,010

(22) Filed: Jun. 8, 2022

(65) Prior Publication Data
US 2022/0402517 A1 Dec. 22, 2022

Related U.S. Application Data

(60) Provisional application No. 63/208,282, filed on Jun. 8, 2021.

(51) Int. Cl.
*B60W 50/14* (2020.01)
*B60W 40/08* (2012.01)
*H04M 1/60* (2006.01)

(52) U.S. Cl.
CPC ............ *B60W 50/14* (2013.01); *B60W 40/08* (2013.01); *H04M 1/6091* (2013.01); *B60W 2050/143* (2013.01)

(58) Field of Classification Search
CPC .................. B60W 50/14; B60W 40/08; B60W 2050/143; H04M 1/6091
See application file for complete search history.

(56) References Cited

U.S. PATENT DOCUMENTS 6,731,925 B2 * 5/2004 Naboulsi ................ G08B 21/06
340/576
8,604,932 B2 12/2013 Breed et al.
(Continued)

OTHER PUBLICATIONS

Mindtronicai, driver-monitoring-module, Jul. 29, 2019.
Charles Murray, NXP, Momenta Partner to Monitor How Alert You Are While Driving, Jun. 28, 2019.

*Primary Examiner* — Frederick M Brushaber
(74) *Attorney, Agent, or Firm* — CALDWELL INTELLECTUAL PROPERTY

(57) ABSTRACT

A system for increasing the safety of voice conversations between drivers and remote parties is shown. The system includes an in-vehicle subsystem and a remote subsystem. The system includes a plurality of sensors which are configured to generate monitoring data. The system includes a computing device, which may be distributed between the subsystems and is configured to calculate a risk level as a function of the monitoring data. The computing device may engage an automatic safety response as a function of the risk level, that may include suspension or termination of on-going conversations among the parties, together with notification about the status of the communication channel. The safety response may be communicated to the driver by generating an alert. The in-vehicle and the remote subsystems communicate using a wireless connection and collaborate in engaging the automatic safety response and communicating any alerts to the driver and remote party using notifications.

20 Claims, 10 Drawing Sheets

(56) References Cited

U.S. PATENT DOCUMENTS

| | | | |
|---|---|---|---|
| 9,679,487 B1 * | 6/2017 | Hayward | G07C 5/02 |
| 9,718,468 B2 | 8/2017 | Barfield, Jr. et al. | |
| 10,235,882 B1 | 3/2019 | Aoude et al. | |
| 10,247,565 B2 * | 4/2019 | Nepomuceno | G01C 21/3492 |
| 10,268,909 B2 | 4/2019 | Sathyanarayana et al. | |
| 10,580,296 B2 * | 3/2020 | Pedersen | G08G 1/0967 |
| 10,872,379 B1 * | 12/2020 | Nepomuceno | G08G 1/096775 |
| 11,450,206 B1 * | 9/2022 | Fields | G08G 1/096827 |
| 2008/0167820 A1 | 7/2008 | Oguchi et al. | |
| 2015/0186714 A1 | 7/2015 | Ren et al. | |
| 2017/0046745 A1 | 2/2017 | Zhu et al. | |
| 2017/0108864 A1 | 4/2017 | Wiklinska et al. | |
| 2017/0200061 A1 | 7/2017 | Julian et al. | |
| 2017/0221149 A1 * | 8/2017 | Hsu-Hoffman | G06Q 40/08 |
| 2017/0292848 A1 * | 10/2017 | Nepomuceno | G01C 21/3492 |
| 2018/0050696 A1 | 2/2018 | Misu et al. | |
| 2019/0213429 A1 | 7/2019 | Sicconi et al. | |
| 2021/0270620 A1 * | 9/2021 | Nepomuceno | G01C 21/3626 |

* cited by examiner

SYSTEMS AND METHODS FOR INCREASING THE SAFETY OF VOICE CONVERSATIONS BETWEEN DRIVERS AND REMOTE PARTIES

CROSS-REFERENCE TO RELATED APPLICATIONS

This application claims the benefit of priority of U.S. Provisional Patent Application Ser. No. 63/208,282, filed on Jun. 8, 2021, and titled "SYSTEMS AND METHODS FOR INCREASING THE SAFETY OF VOICE CONVERSATIONS BETWEEN DRIVERS AND REMOTE PARTIES," which is incorporated by reference herein in its entirety.

FIELD OF THE INVENTION

The present invention generally relates to the field of telematics. In particular, the present invention is directed to increasing the safety of voice conversations between drivers and remote parties.

BACKGROUND

Distracted driving is a serious threat to safety on the roads. It is exacerbated by ever-increasing pressure for people to remain connected to one another at all times.

SUMMARY OF THE DISCLOSURE

We disclose methods and systems to increase the safety of voice conversations between drivers of a vehicle and remote parties. The methods and systems are based on the collaborative exchange and processing of telematics information between sensors and data processing devices located in the vehicles and a remote location.

In an aspect, a system includes an in-vehicle subsystem, and a remote subsystem communicating and exchanging information via a wireless communication means. The subsystems include a plurality of sensors configured to generate monitoring data which can be optionally processed and exchanged between them. The subsystems including a computing apparatus capable of processing the monitoring data and generating automatic safety responses based on a risk level assessment, such response including suspending the voice communication between driver and remote parties when the risk level shows unsafe driving conditions. The risk level assessment is computed as a function of the monitoring data and other information exchanged between the in-vehicle subsystem and the remote subsystem. The computing apparatus is capable of generating automatic safety responses, alerts, and notifications for the driver and remote party as a function of the risk level.

In another aspect, a method including a vehicle and a remote system exchanging information via wireless communication means. The method includes using a plurality of sensors to generate monitoring data, determining a risk level as a function of the monitoring data, engaging using a computing device an automatic safety response as a function of the risk level, putting on hold communications between the parties, communicating the safety response by generating alerts for the driver and remote party, and exchanging notifications between the in-vehicle and the remote subsystem.

These and other aspects and features of non-limiting embodiments of the present invention will become apparent to those skilled in the art upon review of the following description of specific non-limiting embodiments in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for increasing the safety of voice conversations between drivers and remote parties. Without limitations, in an exemplary embodiment, the system may include an in-vehicle subsystem. The in-vehicle subsystem may include plurality of sensors, wherein the plurality of sensors are configured to generate monitoring data. The in-vehicle subsystem may also include a computing apparatus. In one embodiment the computing apparatus is configured to calculate a risk level as a function of monitoring data. An automatic safety response maybe engaged as a function of the risk level. The safety response may then be communicated to the driver by generating an alert. The system also includes a remote subsystem. In an exemplary embodiment the remote subsystem may be configured to receive the alert using a wireless connection to the in-vehicle subsystem. The automatic safety response may then be engaged for the remote subsystem as a function of the risk level. Then the automatic safety response is communicated to the remote party as a function of the alert.

Exemplary embodiments illustrating aspects of the present disclosure are described below in the context of several specific examples.

Figure 1:
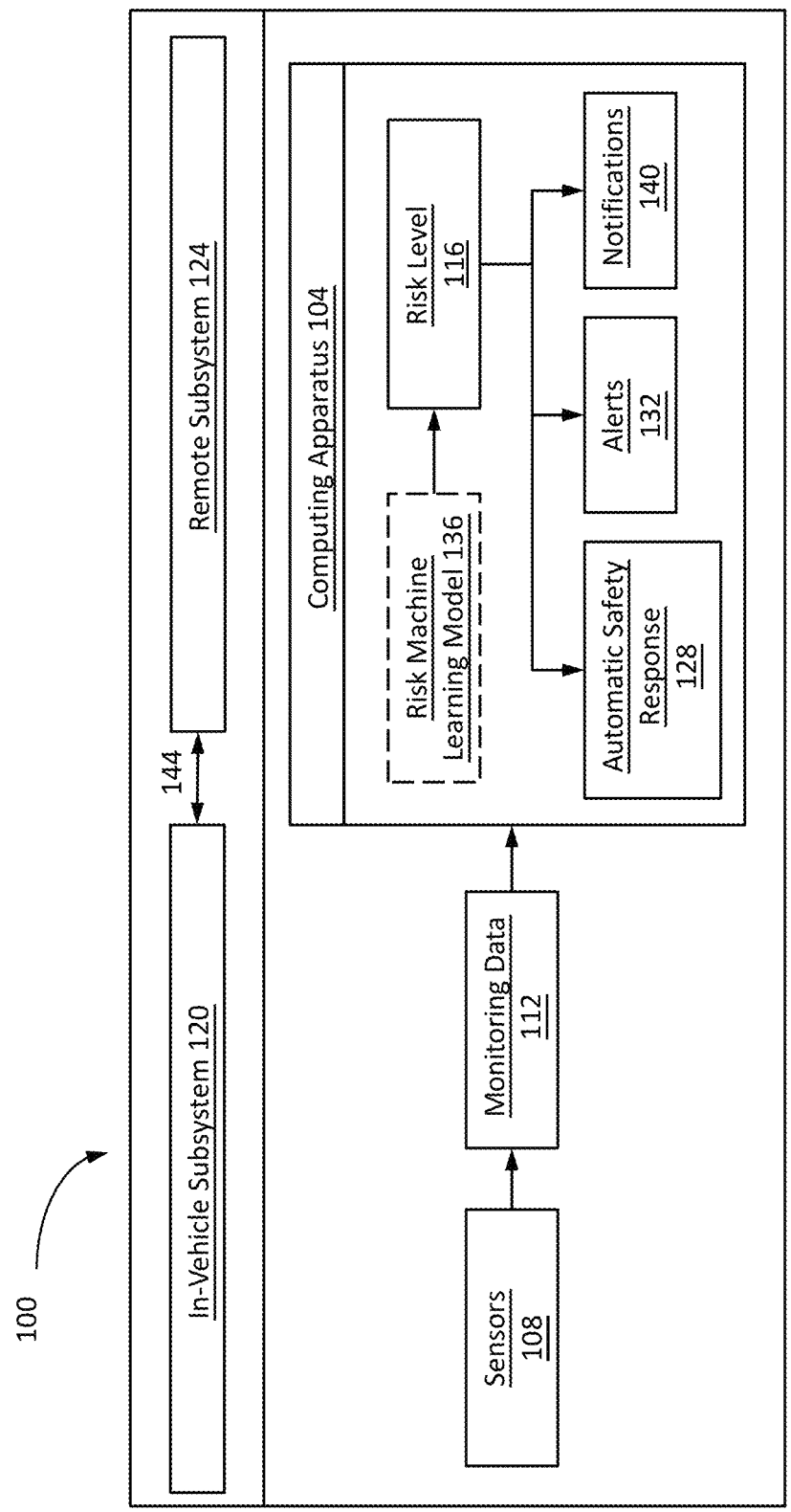
FIG. 1 is a block diagram of an exemplary embodiment of a system for increasing the safety of voice conversations between drivers and remote parties.

Referring now to FIG. 1, an exemplary embodiment of a System 100 for increasing the safety of voice conversations between drivers and remote parties is illustrated. System includes an in-vehicle subsystem 120 communicating with a remote subsystem 124 by wireless communication means 144. System includes a computing device 104. Computing apparatus 104 may include any computing device as described in this disclosure, including without limitation a microcontroller, microprocessor, digital signal processor (DSP) and the like. In this disclosure the computing apparatus may consist of a single device or a plurality of devices located in the in-vehicle subsystem, or the remote subsystem, or both exchanging information and sharing on the computation tasks. The computing apparatus may include, be included in, and/or communicate with a mobile device such as a mobile telephone or smartphone. computing apparatus 104 may include a single computing device operating independently, or may include two or more computing devices operating in concert, in parallel, sequentially or the like. Computing apparatus 104 may interface or communicate with one or more additional devices as described below in further detail via a network interface device. Network interface device may be utilized for connecting computing apparatus 104 to one or more of a variety of networks, and one or more other devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing apparatus. Computing apparatus 104 may include but is not limited to, for example, a computing device or cluster of computing devices in a first location and a second computing device or cluster of computing devices in a second location. computing device 104 may include one or more computing devices dedicated to data storage, security, distribution of traffic for load balancing, and the like. Computing apparatus 104 may distribute one or more computing tasks as described below across a plurality of computing devices of computing device, which may operate in parallel, in series, redundantly, or in any other manner used for distribution of tasks or memory between computing devices. Computing apparatus 104 may be implemented using a "shared nothing" architecture in which data is cached at the worker, in an embodiment, this may enable scalability of system 100 and/or computing device.

With continued reference to FIG. 1, computing apparatus 104 may be designed and/or configured to perform any method, method step, or sequence of method steps in any embodiment described in this disclosure, in any order and with any degree of repetition. For instance, computing apparatus 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing apparatus 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing Still referring to FIG. 1, a plurality of sensors 108 may be used to generate monitoring data 112. As used in this disclosure, a "sensor" is a device that is configured to detect a phenomenon and transmit information related to the detection of the phenomenon. For example, in some cases a sensor 108 may transduce a detected phenomenon, such as without limitation, current, speed, direction, force, torque, moisture, temperature, pressure, the drivers' geographic location, the physical state of the driver, condition of the vehicle, and the like, into a sensed signal. Sensor 108 may include one or more sensors which may be the same, similar, or different. Sensor 108 may include one or more sensor suites with sensors in each sensor suite being the same, similar, or different. As used in the current disclosure, "monitoring data" is an element of data regarding driving conditions. Monitoring data 112 may include the road conditions, weather conditions, traffic conditions, vehicle conditions, physical condition of the driver, traffic events, and the like. In some embodiments, monitoring data 112 may be wirelessly received from a remote computing device. As used in the current disclosure, a "driver" is the operator of a motorized vehicle. A motorized vehicle may include a car, a truck, van, motorcycle, bicycle tractors, construction equipment, and the like.

Still referring to FIG. 1, monitoring data 112 may include road conditions. As used in the current disclosure, "road conditions" is the state and or condition of the road. Road conditions may include defects in the road such as potholes or foreign objects that obstruct traffic. Road conditions may also include whether the condition of the road is rough or smooth. In other embodiments, road conditions may include how much water, ice, or snow is on the road surface.

Still referring to FIG. 1, monitoring data 112 may include weather conditions. As used in the current disclosure, "weather conditions" is the state of the atmosphere, describing for example the degree to which it is hot or cold, wet, or dry, calm, or stormy, clear, or cloudy. Weather conditions may take into account a weather forecast. Weather conditions include rain, sleet, snow, ice, wind storms, flooding, and other weather related events. Weather conditions may also include a consideration of the severity of the weather conditions. For example, weather conditions may weight the severity of 1" of snow vs 22" inches of snow for the driver's path.

Still referring to FIG. 1, monitoring data 112 may include traffic conditions. As used in the current disclosure, "traffic conditions" is an element of data regarding other motorists and pedestrians. In an embodiment, traffic conditions may include the location of other motorists or pedestrians as a function of the driver. Traffic conditions may include the actual or predicted driving pattern of other drivers. For example, Sensor 108 may alert the driver that another vehicle behaving erratically and could potentially present danger to the driver. In another example, sensor 108 may alert the driver that a pedestrian is behaving in a manner that could potentially present danger to the driver or pedestrian. Traffic conditions may also include situations where there is a high probability that the driver will be involved in an automobile accident.

Still referring to FIG. 1, monitoring data 112 may include vehicle conditions. As used in the current disclosure, "vehicle conditions" is the overall state or condition of the vehicle which the user is driving. Vehicle conditions include considerations of the amount of gas in the vehicle, battery charge level in an electric vehicle, tire pressure, engine health, and the like. Vehicle considerations may include considerations of possible mechanical failures of the vehicle. A person who is reasonably skilled in the art would be aware of the plurality of ways a vehicle may encounter mechanical failure. Vehicle conditions may include the geographic location of the. Vehicle conditions may include information regarding engine health and operation such as temperature readings, revolutions per minute (RPM) monitoring, monitoring of leaks and the like.

Still referring to FIG. 1, monitoring data 112 may include physical condition of the driver. As used in the current disclosure, "physical condition of the driver" is an element of data relating to the condition of the driver. The physical condition of the driver may include considerations of the alertness of the driver. This may include when the driver is drowsy, sleepy, intoxicated, distracted, and the like. For example, physical condition of the driver may include a situation where the driver is texting and driving. In another example, physical condition of the driver may include situations where the driver is falling asleep at the wheel. Physical condition of the driver may be generated in sensor 108 by a driver facing camera that generates a video stream for a feature-analysis unit that uses deep learning to extract head pose, eye gaze, eyelid closing information. The features are analyzed by a drowsiness analysis unit and a distraction analysis unit that determine the respective severity levels.

Still referring to FIG. 1, monitoring data 112 may include driving data. As used in the current disclosure, "Driving data" is an element of data relating to the skill, aptitude, and experience of the driver. Driving data may include any element of data relating to a driver's history including speed, overall driving safety, affinity for car crashes, and the like. Driving data includes a multitude of parameters such as driver identification, geographic location, speed, acceleration, braking, cornering, throttle aperture, steering wheel motion, time of day, weather conditions, traffic information, proximity to surrounding cars (ahead, behind, on the side), positioning in lane, driver face/eye gaze direction, eyelids closing patterns, hands position and gestures, spoken utterances and their transcription, acoustic noises in the cabin, video recording of key events (e.g., crashes).

Still referring to FIG. 1, sensor(s) 108 may include any number of suitable sensors which may be efficaciously used to generate data used to compute risk level 116. For example, and without limitation, these sensors may include a humidistat, hygrometer, voltage sensor, current sensor, multimeter, facial recognition sensor, vision sensors, vehicle sensors, vehicle detection sensors, magnetometer, radar sensors, optical sensor, measuring light grid, virtual loop sensor, ground sensor, ice detection sensor, a plurality of cameras, lidar, radar, and the like, among others. Sensor(s) 108 may efficaciously include, without limitation, any of the sensors disclosed in the entirety of the present disclosure. Sensors 108 may include any sensor or monitoring device, including a sensor suite, standalone sensor, one or more computing devices, or combinations thereof as described in U.S. patent application Ser. No. 16/589,241 filed on Oct. 1, 2019 and titled, "SYSTEMS AND METHODS FOR USING ARTIFICIAL INTELLIGENCE TO PRESENT GEOGRAPHICALLY RELEVANT USER-SPECIFIC RECOMMENDATIONS BASED ON USER ATTENTIVENESS" which is incorporated herein by reference in its entirety.

With continued reference to FIG. 1, the number, and the type of sensors 108 in system 100 may change in different embodiments without limiting the scope of the invention. For example, one embodiment may include two sensors 108: a video camera pointed to driver, and another pointed to the road in front of the vehicle. The monitoring data 112 from these sensors 108 may be used to evaluate Risk Level 116 factor based on the driver's alertness in the context of the traffic conditions on the road. It should also be noted that the algorithms used to compute a Risk Level 116 need not be static. For example, the algorithms may use artificial intelligence methods to analyze the video of the driver's face and adapt the computed Risk Level 116 based on the age or experience of driver, or when detecting that driver is becoming increasingly fatigued and more prone to making mistakes, thus tightening the rules for safety margins.

With continued reference to FIG. 1, smartphone may be used to generate monitoring data 112. A smartphone may be connected to the vehicle using Bluetooth, wireless connection, or other wired connection. A smartphone may be used as microphone and speaker on a visor or disposed somewhere close to driver. A computing device 104 may provide computation to run context analysis, combine it with the features extracted by the smart camera to decide about driver's attention margin and provide audio feedback when necessary. A smartphone may provide telemetry data, map/routing info, cloud services (weather, traffic), audio/video recording capabilities and speech recognition and synthesis for dialog interaction with the driver. The smartphone further collects sensor information (3D accelerometer, 3D gyroscope, GPS location and timestamps) and transfers processed information to the cloud. Devices to monitor location may include global positioning system (GPS), inertial measurement units (IMU), accelerometers, tracking devices, geographical information systems (GIS), traffic maps, road maps, or the like. Devices to monitor the location may include weather monitoring devices located remotely or onboard the vehicle in which system 100 is installed. Devices to monitor the location may include weather monitoring devices may include radar, doppler radar, thermometers, barometers, hygrometer, anemometers, pyranometer, rain gauge, windsock, wind vanes, transmissometer, and the like.

With continued reference to FIG. 1, Sensor 108 may include a camera; video camera may be a USB connected camera containing RGB (Red, Green, Blue a.k.a. visible) and NIR (Near Infrared) sensors, coupled with an infrared LED scanner, to extract face and eyes features. Visible and NIR Camera pointed to driver face/eyes to analyze head pose; eye gaze tracking and record driver's face and back passenger seat in case of accident, Speech and Gesture Interface for driver to provide or request information via microphone, face or hand gestures, Biometric and Vital Signs (HRV, GSR) data provided via wearable bracelet, sensors on steering wheel or driver seat, wireless evaluation of Heart Beat and Breathing patterns, Forward-facing Camera to detect lane lines, distance from vehicles in front, scene analysis and recording, Rear Camera to view, analyze, record (in case of accident) back of car, 3D Accelerometer, Gyroscope, Compass, GPS (time, location, speed), plus VIN, Odometer, RPM, Engine Load via OBD II connection, Traffic, weather, day/night illumination, road conditions, in-cabin noise or voices, Feature extraction from visual clues (attention, distraction, drowsiness, drunkenness, face identification, problematic interactions between driver and passenger(s), Feature extraction of spoken words (Speech Reco, Natural Language Processing (NLP)), detection of altered voice, detection of hand gestures, Feature extraction of fatigue, stress, reaction to fear/surprise, from biosensors; Feature extraction of objects (vehicles, walls, poles, signs, pedestrians, . . . ) as well as relative distance and movements, position of car with respect to lane markings, detection of road signs, Feature extraction of vehicle position and speed behind car; Feature extraction of driving smoothness/aggressiveness, Feature extraction of ambient "harshness" and impact on driving stress.

With continued reference to FIG. 1, in some embodiments of apparatus 100, sensor 108 may be communicatively connected with a computing apparatus 104. Sensor 108 may communicate with computing apparatus 104 using an electric connection. Alternatively, sensor 108 may communicate with computing apparatus 104 wirelessly, such as by radio waves, Bluetooth, or Wi-Fi. One of ordinary skill in the art, upon reviewing the entirety of this disclosure, would recognize that a variety of wireless communication technologies are suitable for this application. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, system 100 may be configured to determine a risk level 116 as function of monitoring data 112 using risk machine learning model 136 and other data external to subsystem 120. As used in the current disclosure, "Risk level" is an element of data that represents the level and severity of risk a driver is exposed to. Risk level 116 may be calculated in an in-vehicle subsystem 120 and/or a device remote from the vehicle such as without limitation a remote subsystem 124, for instance as described in further detail below; any process, process step, module, and/or methodology for determining and/or calculating risk model as described in this disclosure may be performed by in-vehicle subsystem 120 and/or by remote subsystem 124. In embodiments, a remote device may include smartphones, tablets, laptops, or the like that are not located within the vehicle. Risk Level 116 may be a number representing an assessment of the potential impact of the voice conversation on the safety of the driver. Risk can be evaluated as bodily harm to the driver, pedestrians, or other motorists. Risk may also include damage to property, other motorists, and the divers vehicle. In embodiments, risk level 116 may be expressed in a range or a graduated scale, where a "graduated scale" measures levels of risk as gradations measured between a maximal risk level and a minimal risk level. For a non-limiting example, the range may be 1-10, 1-50, or 1-100, and the like. Whereas a risk level 116 of 1 represents little to no risk for the driver and a risk level 116 of 10 on a scale of 1-10 represents that the driver or other motorists is in imminent danger of bodily injury or property damage. Risk level 116 may also include qualitative descriptors such as, as non-limiting example, "low danger," "medium danger," and/or "high danger." As a further non-limiting example, qualitative descriptors may include "safe," "unsafe," and/or "uncertain." As another non-limiting example, qualitative descriptors may include "alert," "tired," and/or "drowsy." A person of ordinary skill in the art would appreciate, after having reviewed the entirety of this disclosure, that a variety of qualitative descriptors may be used for this purpose.

With continued reference to FIG. 1, risk level 116 may be calculated using a risk machine learning model 136. In embodiments, a risk machine learning model 136 may include a classifier, which may be consistent with the classifier disclosed with reference to FIG. 8. Inputs to the machine learning model may include a plurality of monitoring data 112, examples of other risk levels 116, examples of other monitoring data 112, road conditions, weather conditions, traffic conditions, vehicle conditions, physical condition of the driver, traffic events, and the like. The output of the machine learning model is a risk level 116 that reflects the current situation. Risk machine learning model 136 may by trained using risk training data. Risk training data is a plurality of data entries containing a plurality of inputs that are correlated to a plurality of outputs for training a computing apparatus 104 by a machine-learning process. Risk training data may include past monitoring data, examples of other risk levels 116, examples of other monitoring data 112, and the like. Risk training data may include correlations between past monitoring data and past risk levels. "Past," refers to the fact that the data was collected prior to the current monitoring data; however, past monitoring data and past risk levels need not have been calculated by in-vehicle subsystem. Risk training data may be stored in a database, such as a training data database, or remote data storage device, or a user input or device.

With continued reference to FIG. 1, a risk machine learning model 136 may additionally receive input information comprising vehicle dynamics, traffic/weather/road conditions, GPS/route info, road facing camera to characterize risk and to escalate the urgency if the driver fails to act. Risk Machine learning and precomputed risk models are used to calibrate the risk estimation process to the skills and experience of the driver. Inputs into the main decision engine may include information about distraction and drowsiness levels, risk level, leveraging mandated behavior guidelines, considering user preferences, and relying on decision models and Risk Machine Learning model 136 to determine what messages to convey to the user. A dialog interaction engine triggered by the decision engine generates prompts to the driver using sound and speech synthesis to drive a speaker array. Microphones capture driver's reaction, comments, requests to create actionable text via speech recognition and NLP used by the dialog interaction engine evaluate responsiveness of the driver. When dialog is used to assess or restore attention of a drowsy driver, the dialog interaction engine relies on dialog history, short-term driver information, trip data and information about driver's skills to decide about type of content, pace, length of the interaction to drive the dialog with the driver. Long-term driving data and statistics about dialog interactions are used to evaluate driver performance effectiveness (ability to take right corrective actions, timely), responsiveness of the driver to system generated guidance, and to compile driving risk profiles and driver performance trends. The dialog interaction engine may use the blue LED light to generate brief timed blinking patterns as part of a mechanism to evaluate driver's alertness (e.g., mimicking light patterns with corresponding blinking of eyelids). Any one or more sensors may analyze, modify, or track user attentiveness as described in U.S. patent application Ser. No. 16/590,264 filed on Oct. 1, 2019 and titled "METHODS AND SYSTEMS FOR USING ARTIFICIAL INTELLIGENCE TO EVALUATE, CORRECT, AND MONITOR USER ATTENTIVENESS" which is incorporated herein by reference in its entirety.

With continued reference to FIG. 1, in one embodiment the computing apparatus 104 in system 100 is used to process the data from the plurality of sensors 108 to compute a Risk Level 116 by using inventive algorithms and/or artificial intelligence methods. Algorithms and/or artificial intelligence methods may include machine learning methods as described herein. In other embodiments, the Risk Level 116 may be computed in the in-vehicle subsystem, the remote subsystem, or cooperatively computed and determined by both subsystems. In any case, the determination of whether a voice conversation can be carried out with minimal safety risks is made by the value of the Risk Level 116 which should be indicative of one or more of various safety factors, such as the behavior and alertness of the driver, the operational aspects of the vehicle, the traffic and road conditions, and whether any driving events exceed predetermined "safety margins".

With continued reference to FIG. 1, system 100 incudes an in-vehicle subsystem 120 and a remote subsystem 124. As used in the current disclosure, the in-vehicle and remote subsystems are configured to monitor and manage audio or video calls between a driver and a remote party or parties. As used in the current disclosure, remote party" is a person who is participating in a voice or video call with the driver. As used in this current disclosure, these subsystems exchange information over significant distances by electronic means 144 using various types of technologies over wire, radio, optical, or other wireless electromagnetic systems. As used in the current disclosure, an "in-vehicle subsystem" is a subsystem located inside a vehicle. A vehicle may include a car, or a truck, motorcycle, autonomous vehicle, bicycle, tractor trailer, or any other moving vehicle operated by driver. In a non-limiting embodiment, an in-vehicle subsystem 120 may not include a display. In other embodiments an in-vehicle subsystem 120 may include a limited screen display. This display may only make the driver aware of the risk level and other hazards. As used in the current disclosure, a "remote subsystem" is a subsystem remote from the vehicle the subsystem may optionally be collocated with the remote party. In some embodiments, the computing apparatus 104 and sensors 108 may be distributed between the in-vehicle subsystem 120 and the remote subsystem 124. Additionally, in-vehicle subsystem 120 or remote subsystem 124 may be located all or in part within a smartphone. An in-vehicle subsystem 120 and remote subsystem 124 may be completely or partially comprised of the same components. In embodiments, there may be a plurality of remote subsystems 124 in communication with an in-vehicle subsystem 120 or a plurality of in-vehicle subsystems 120 in communication with a remote subsystem 124.

With continued reference to FIG. 1, a computing apparatus 104 may engage an automatic safety response 128 as a function of the risk level 116 for the driver of the in-vehicle subsystem 120. As used in the current disclosure, "automatic safety response" is a corrective action used to lower the risk level 116 to the driver. In an embodiment, an automatic safety response may terminate, suspend, silence, a given an audio or video call between the driver and a remote party as a function of the risk level 116. For example, once a risk level 116 rises above 7 out of 10 all audio or video calls may be suspended between the driver and a remote party. Once risk level 116 decreases below a 7 the audio or video call may resume. Automatic safety response 128 may be engaged as a function of a predetermined risk level. For example, a driver may set the automatic safety response 128 to be engaged at a risk level 116 of 5. Automatic safety response 128 may also be engaged as a function of a parental control or administrative control. For example, a parent may set the automatic safety response 128 to be engaged at a risk level 116 of 6. In another example, an employer may set the automatic safety response 128 to be engaged at a risk level 116 of 7. A driver may additionally engage an optional setting of when the risk level 116 rises to 10 out of 10 emergency services may be notified of the imminent/ongoing vehicle accident or property damage.

Still referring to FIG. 1, automatic safety response 128 may include notifying emergency services. As used in the current disclosure, "emergency services" are organizations which ensure public safety and health by addressing different emergencies. Some of these agencies may exist solely for addressing certain types of emergencies whilst others deal with ad hoc emergencies as part of their normal responsibilities. Many of these agencies engage in community awareness and prevention programs to help the public avoid, detect, and report emergencies effectively. Emergency services may include Police, law enforcement, Fire and Rescue services, EMS, Ambulance services, Animal services, and other community services.

Further referring to FIG. 1, automatic safety response may alternatively or additionally be determined by, and/or transmitted to, remote subsystem. Remote subsystem may determine automatic safety response using monitoring data and/or risk levels, and may do so using any methods, method steps, modules, or any other elements and/or processes usable by in-vehicle subsystem to determine automatic safety response. Alternatively, a first subset tasks for determination of automated safety response may be performed by in-vehicle subsystem while a second subset may be performed by remote subsystem.

With continued reference to FIG. 1, a computing apparatus 104 may engage an automatic safety response 128 as a function of the risk level 116 for the remote party. In an embodiment, an automatic safety response 128 may terminate, suspend, or silence a given audio or video call for the remote party as a function of the risk level 116. The remote party communicating with a remote subsystem 124 may receive notice of the termination, suspension, or silence of the audio call. After a predetermined period of time, the automatic safety response 128 may terminate, an audio or video call for the remote party.

With continued reference to FIG. 1, the automatic safety response may be communicated to the driver via an alert 132. Alerts 132 may include audio, visual, and/or haptic alerts to inform the driver of some of the automatic safety response 128. Audio alerts 132 may include spoken words, or alternatively other audio signals such as warning beeps, tones, or the like. Visual alerts 132 may include color lights or signs serving the same purpose as the audio alerts. Haptic alerts 132 may include vibrating, pulsing, moving of components, change in temperature, or the like that driver may sense. In embodiments, alerts 132 may be minimally distractive to the driver so as not to impact his concentration. In embodiments, alerts 132 may automatically alter operation of vehicle in which system 100 is installed. System 100 may transmit the alert 132 to remote subsystem 124 by wireless means. This may also include transmitting data that may optionally include Risk Level 116, the actions and other relevant monitoring data 112. Wireless means may include satellite, Wi-Fi, or any other remote broadband wireless communications means such as 4G LTE and 5G.

With continued reference to FIG. 1, in-vehicle subsystem and remote subsystem may exchange notifications 140 as a function of at least one of the monitoring data, the risk level, and the automatic safety response; for instance, a first notification may transmit some or all of monitoring data from in-vehicle to remote subsystem, a second notification and/or the first notification may transmit a risk level to the remote subsystem, and a third notification, the second notification, and/or the first notification may transmit the automatic safety response and/or information indicating that automatic safety response has been performed to remote subsystem. Notification 140 may include audio, visual, and/or haptic alerts to inform the remote party of a of the automatic safety response 128. Auditory notifications 140 may include spoken words, or alternatively other audio signals such as warning beeps, tones, or the like. Visual notifications 140 may include color lights or signs serving the same purpose as the audio alerts. Haptic notifications 140 may include vibrating, pulsing, moving of components, change in temperature, or the like that remote party may sense. In embodiments, notifications 140 may automatically alter operation of remote subsystem 124.

Figure 2:
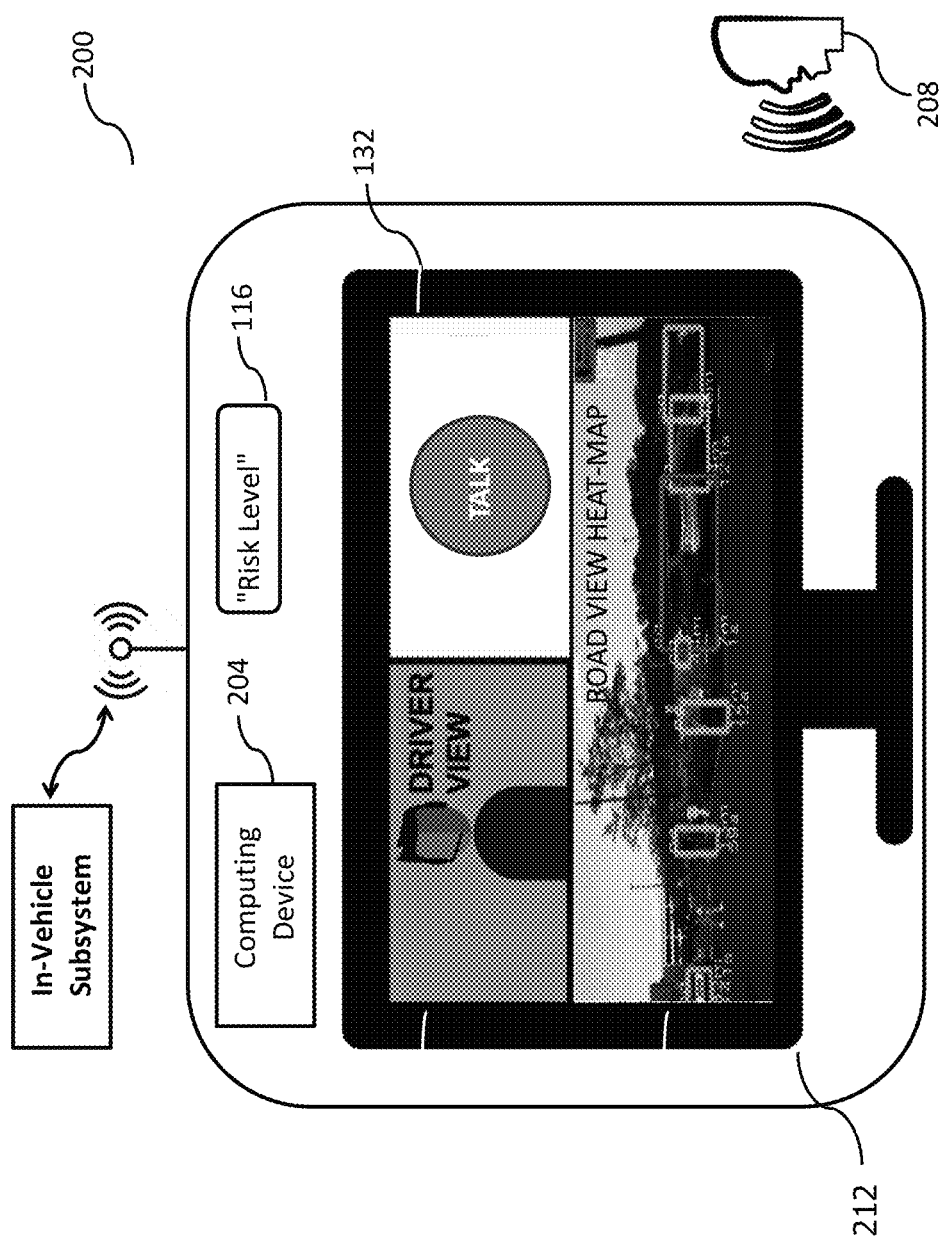
FIG. 2 is a graphical representation of the possible components of a remote subsystem.

Referring now to FIG. 2, a graphical representation of the possible components of a remote subsystem 200 which may be collocated with a remote party 208 is illustrated. Remote subsystem 200 may include one or more computing device 204, which is consistent with computing apparatus 104 described herein. In an embodiment, remote subsystem 200 may be a smartphone, tablet, laptop, or the like. There may be one or more remote subsystems 200. One or more remote subsystems 200 may communicate with an in-vehicle Subsystem 120 that generates automatic safety response 128 and alert 132 affecting a voice conversation between a remote party 208 and a driver. The Risk Level 116 for the remote subsystem will generally mirror the automatic safety response 128 and alert 132 of the In-Vehicle Subsystem 120. Automatic safety response 128 for remote subsystem 200 may include starting, suspending, resuming, or stopping the conversation. Alerts 132 may include audio or visual alerts to inform the remote party 208 of some of these actions. An example of a visual alert 132 is shown in the sub-screen 136 of the display 212 in the remote subsystem 200. This exemplary alert uses a color code, such as green, and text, such as the word "talk" to inform the remote party 208 that the voice conversation with the driver can proceed. As used in the current disclosure, "display," refers to a visual apparatus that is comprised of compact flat panel designs, liquid crystal display, organic light-emitting diode, or combination thereof to present visual information superimposed on spaces. Display 212 may include a graphical user interface (GUI), multi-functional display (MFD), screens, touch screens, speakers, haptic feedback device, live feed, window, combination thereof, and the like. In a nonlimiting embodiment, display 212 may include a mobile computing device like a smartphone, tablet, computer, laptop, client device, server, a combination thereof, or another undisclosed display alone or in combination. Display 212 may be available for only the remote party. Alternatively or additionally, in-vehicle subsystem may include outputs for any or all elements of display 212 or any other elements described in reference to this figure. In embodiments, inclusion in-vehicle of display 212 and/or one or more elements, and/or use thereof, may be determined according to likelihood of distracting a driver of vehicle. For example, a video display may not be used to output an alert to a driver, to avoid visual distraction; instead, alert may be output using a combination of audio output, haptic output, and/or indicator lights.

Still referring to FIG. 2, Remote subsystem 200 may also display other optionally received information such as a sub-screen with video from the driver's face and a heat-map illustrating road conditions. A "risk heat map" for the purposes of this disclosure, is a system that displays colored transparent overlays on top of objects (e.g., pedestrians, vehicles, road debris) in the road view video along with optional information about time, location, speed, 3D acceleration of the vehicle. In this manner, the risk heat map may present information such that the remote party 208 may assess and better understand the severity of the risk of collisions with pedestrians, animals, or other vehicles leading to the alerts and actions taken by the system. These sub-screens shown in FIG. 2 may also be used by the remote party 208 to help pace the conversation, for example, by modulating the speed of the conversation and by referring to traffic or dangers more often in the conversation. When the Risk Level 116 is such that the conversation is not allowed, these sub-screens may also be used by the remote party 208 to gain a better understanding of the level of stress the driver is facing from rapidly changing traffic conditions.

In-Vehicle Subsystem 120 transmits to remote subsystem 200 by wireless means, data that may optionally include Risk Level 116, the actions and other relevant monitoring data 112. Wireless means may include satellite, Wi-Fi, or any other remote broadband wireless communications means such as 4G LTE and 5G.

It should be understood that the exemplary sub-screens in the display 206 are only illustrative. Many types of data may be displayed in a variety of formats. Similarly, the means by which the actions and alerts are communicated to the remote party 208 may differ from the exemplary case shown in sub-screen 136. These illustrations should not be interpreted as limiting the scope of the invention.

Figure 3A:
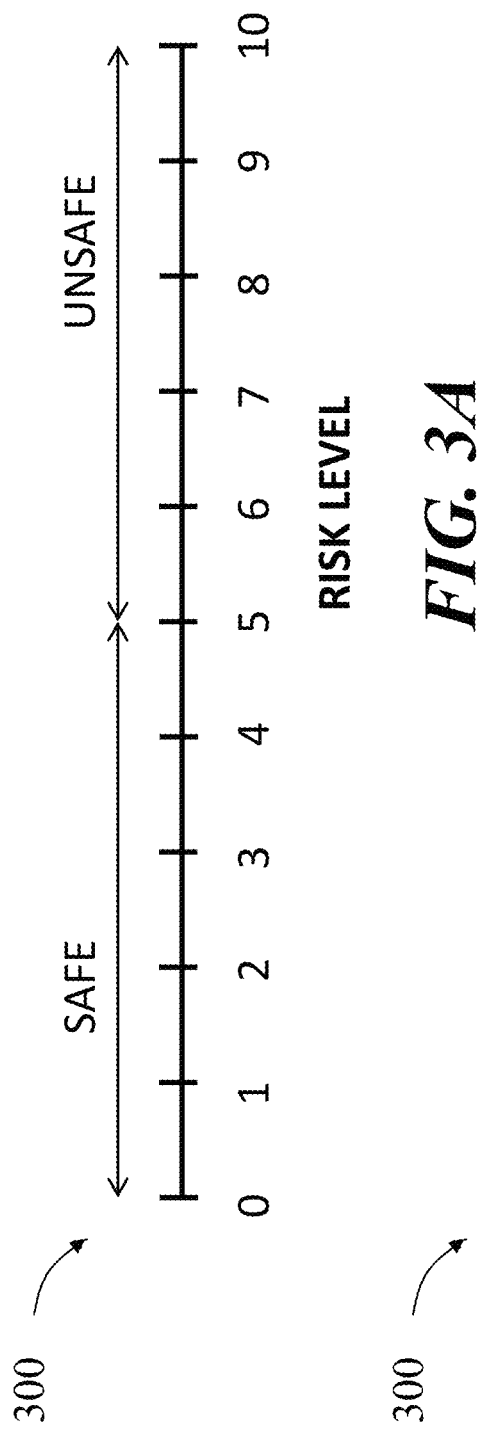
FIGS. 3A and 3B is a graphical representation of two illustrative embodiments of possible Risk Level scales.
Figure 3B:
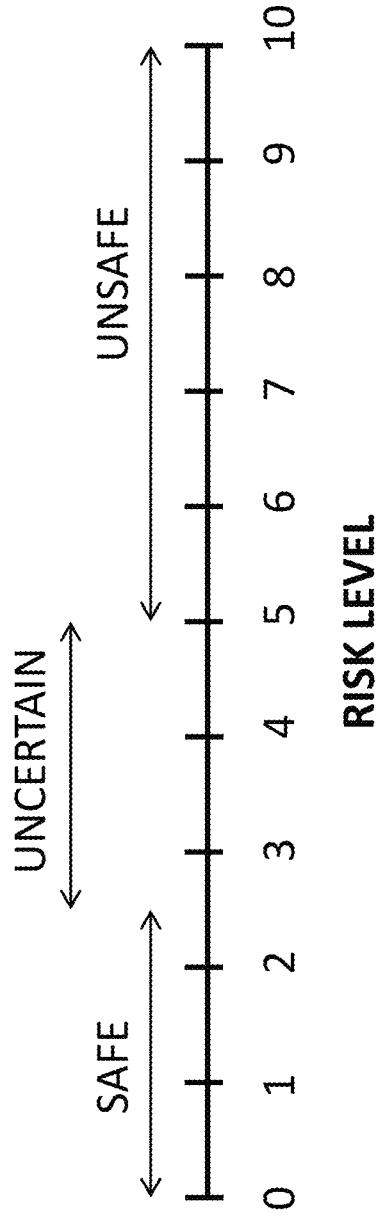

Referring now to FIGS. 3A and 3B, a representation of two illustrative embodiments of possible Risk Level 116 scales with safety labels assigned to different ranges is illustrated. FIG. 3 is a representation of two sets of labels assigned to a Risk Level 116 scale in the range of 0 to 10. In FIG. 3A a Risk Level in the range of 0 to 5 is labeled as "SAFE", meaning it is associated with an action and alert permitting the voice conversation to proceed. Similarly, the Risk Level 116 in the range 5 to 10 is labeled as "UNSAFE", meaning it is associated with an automatic safety response 128 and alert 132 in which system 100 and the remote subsystem 124 automatically suspend or mute the conversation. In FIG. 3B an additional Risk Level in the range 2.5 to 5 is introduced and labeled as "UNCERTAIN". The possible automatic safety response 128 and alerts 132 associated with this label may depend on different embodiments. It should be noted that the use of the 0 to 10 scale of Risk Levels, their label assignments and the associated actions and alerts is only illustrative and that there are many other possible options; this use should not be interpreted as limiting the scope of the invention.

Figure 4:
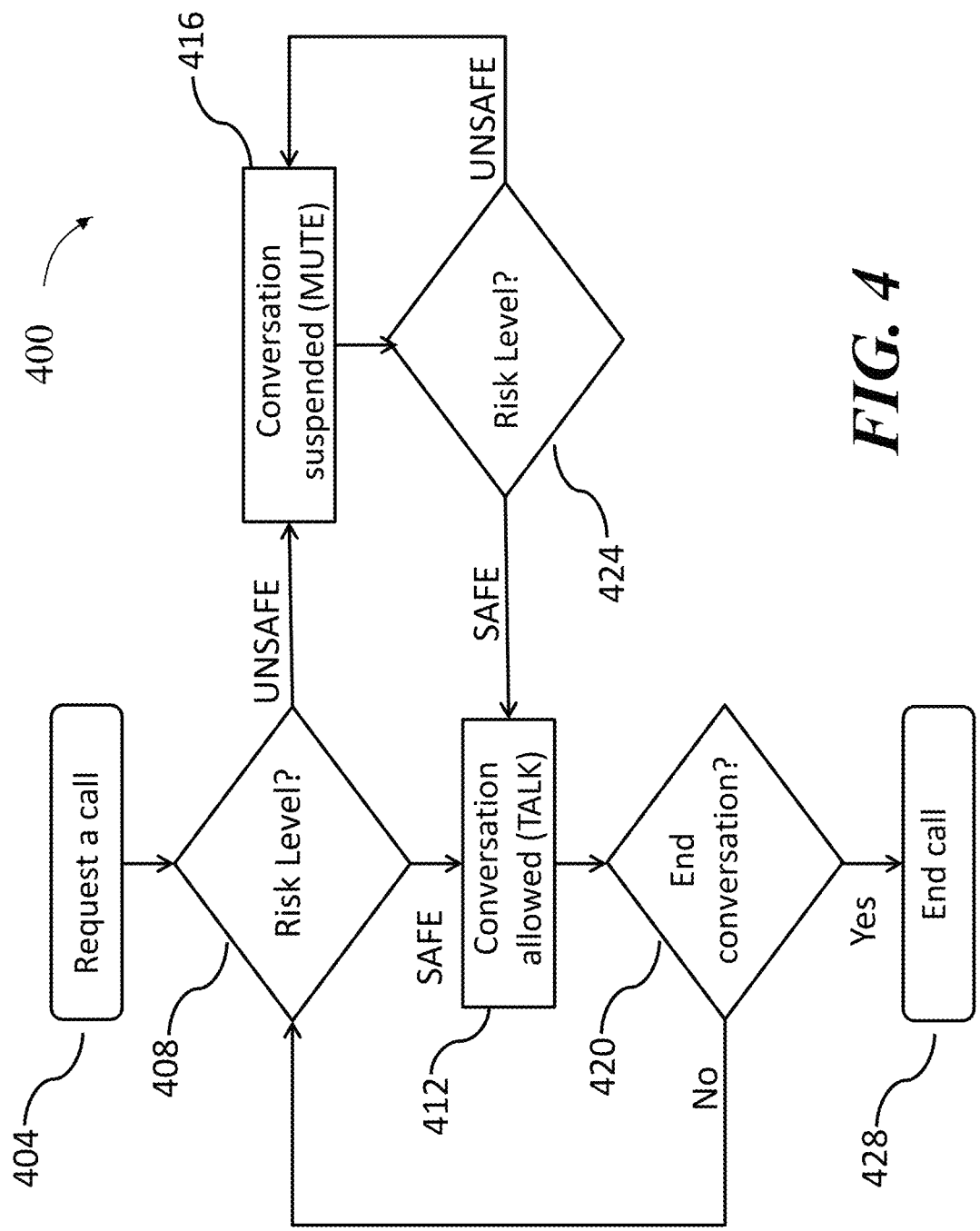
FIG. 4 is block diagram of an embodiment of the illustrating how a Risk Level is used to regulate remote voice conversation.

Referring now to FIG. 4, a flow diagram of an embodiment illustrating how a Risk Level 116 is used to automatically allow or suspend a remote voice conversation. FIG. 4 is a flow chart of one embodiment of the invention illustrating the actions taken by system 100 of FIG. 1. and remote subsystem 200 to manage the pace of a voice conversation according to the Risk Level scale in 3A.

With continued reference to FIG. 4, at step 404, in this embodiment either the driver or the remote party requests a call. Before the call is allowed, a Risk Level 116 is computed by the System 100, remote subsystem 200, or both.

With continued reference to FIG. 4, at step 408, if the Risk Level 116 is labeled as "SAFE", the conversation is allowed to proceed in to step 412, whereas if the Risk Level 116 is labeled as "UNSAFE", the conversation is not allowed to proceed and is automatically suspended by the system in 416.

With continued reference to FIG. 4, at step 412, if the conversation proceeds, the system checks if either the driver or the remote party requests an end to the conversation in 420; if there is no such request the system loops around and checks again the Risk Level in 408.

With continued reference to FIG. 4, at step 416, the conversation is suspended or muted due to the risk level being assessed as "UNSAFE". The duration of the suspension in 416 will depend on continuously checking the Risk Level in 416 until it becomes "SAFE", and the conversation is allowed to proceed or resume in 412.

With continued reference to FIG. 4, at step 420, the system checks if either the driver or the remote party requests an end to the conversation in 420.

With continued reference to FIG. 4, at step 424, when the conversation is suspended at 404, the system assesses the risk level again, and if deemed safe, call is allowed such as in step 412.

With continued reference to FIG. 4, at step 428, if there is a request to end the conversation by either the driver or the remote party, the call and the conversation will end. In this manner, both parties are capable of terminating the call at any moment and for whatever reason, even if the Risk Level 116 is deemed "SAFE".

With continued reference to FIG. 4, it should be noted that in this embodiment the system 100 and remote subsystem 200 may automatically make, suspend, and resume decisions without the driver having to explain why driver, such as driver needs to stop talking or listening, thus minimizing distractions, and helping focus the driver's attention on the road. In this manner, the actions by these subsystems attempt to approximate the same dynamics that take place when the conversation is between the driver and a fellow passenger in the vehicle.

With continued reference to FIG. 4, an embodiment may be used by professional drivers in low-traffic and low-stress routes to stay mentally alert by having spoken conversations with remote parties, such as family members without the need of notifying the remote parties of the driver's availability and responsiveness.

With continued reference to FIG. 4, an embodiment may also be used when the remote party is also a driver. This frequently happens when professional drivers update each other on deliveries and issues encountered on the road while they are actively driving. In this case, the Risk Level 116 used in FIG. 4 should be a combination of the Risk Levels computed for each one of the plurality of drivers. In other words, the "SAFE" condition in this block diagram should only happen when the individual Risk Levels 116 computed by each driver is also "SAFE", otherwise, the overall Risk Level 116 is deemed "UNSAFE".

With continued reference to FIG. 4, an embodiment may be configured to allow a remote party (e.g., a fleet manager) to hold a conversation with multiple drivers simultaneously provided that each individual driver's Risk Level 116 is "SAFE". Should one or more drivers' Risk Level 116 become "UNSAFE", the system would suspend the conversation until every driver's condition moves back to "SAFE" again. Alternatively, the remote party may record a voice message to be played back and responded by the drivers at different times, such as whenever it is "SAFE" for each of them to do so. In nonlimiting examples the case of a fleet manager who wishes to poll his drivers about their availability and possible schedule to do additional unexpected deliveries. The manager may record the question to be transmitted to each driver whenever it is "SAFE" to do so; he may then have speech recognition software running in the remote subsystem 201 processor to interpret the drivers' replies whenever they come.

Figure 5:
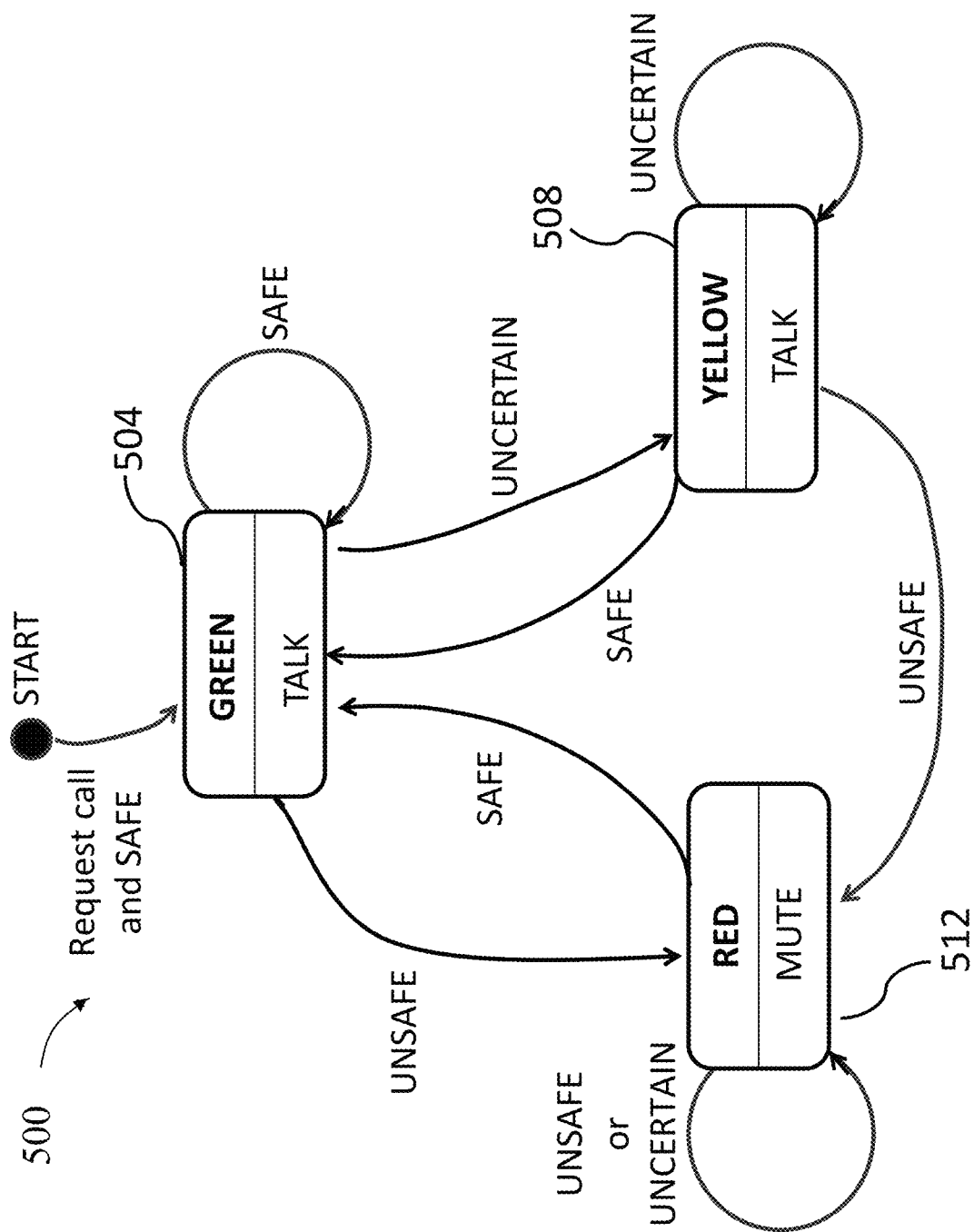
FIG. 5 is a state diagram of an illustrative set of alerts and actions generated in response to transitions in the Risk Levels of FIG. 3B.

Referring now to FIG. 5, a state diagram of an illustrative set of automatic safety response 128 and alert 132 in response to transitions in the Risk levels 116 which may be illustrated in reference to FIG. 3B. FIG. 5 is an exemplary alert state diagram used to illustrate a possible set of automatic safety response 128 and alert 132 generated in response to changes in the labels associated to the Risk level 116 scale in FIG. 3B. After a call request is deemed "SAFE," a visual alert (e.g., the sub-screen shown in FIG. 2.) would light up with a green color as indicated by the bold text in the top portion of 504. This alert tells the parties that the conversation channel is open for them to talk. The action associated with this alert is for the system to open this channel for the parties to "TALK," as indicated by the text in the bottom portion of 504. The conversation channel will then remain open as long as the Risk level 116 is deemed "SAFE". If the Risk level 116 changes to "UNCERTAIN", the color of the visual alert turns yellow, as shown in the top text of 504, but the system keeps the conversation channel open, as indicated by the action "TALK" shown at the bottom of 504. The yellow light alert may be used to indicate to the remote party that the driving conditions may be approaching a dangerous condition who may, in turn, decide to pay more attention to the remote subsystem 200 display to observe the driver and the road conditions using the sub-screens as shown in FIG. 2. The remote party may then pause, slow down, or ask questions to the driver about traffic conditions. Whenever the Risk level 116 is assessed as "UNSAFE", the system will transition to the alert state red in 512 from either state 504 or 508. The associated action is then to automatically and forcibly MUTE the conversation as indicated in the bottom of state 512. In this example, once in the red state, the conversation will remain suspended or muted for as long as the Risk level 116 is deemed "UNSAFE" or "UNCERTAIN" and the color of the visual alert will also remain as red. Whether the current state is yellow or red whenever the Risk level 116 is deemed "SAFE" again, the system transitions back to the green state in 504 and the cycle repeats.

With continued reference to FIG. 5, it should be noted that if a couple of changes, the block diagram in FIG. 4 illustrating the pace of a conversation according to an embodiment of this invention using the Risk level 116 scale and safety labels in FIG. 3A can also be made consistent with the safety label assignments in FIG. 3B and with the alert/action state diagram of FIG. 5. First the "SAFE" output from decision 408 should be replaced with "SAFE or UNCERTAIN", and the "UNSAFE" output from decision 424 should be replaced with "UNCERTAIN or UNSAFE".

Figure 6:
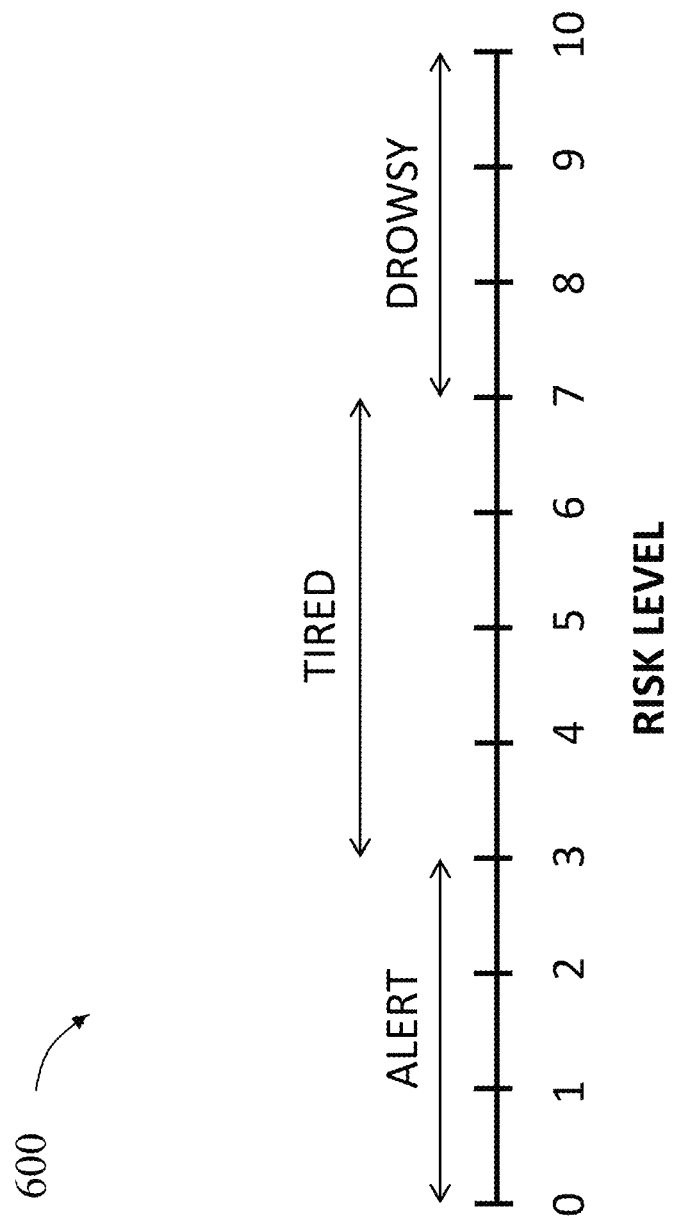
FIG. 6 is a representation of an illustrative Risk Level scale with driver alertness labels assigned to three ranges.

Referring now to FIG. 6, a representation of an illustrative Risk level 116 scale with driver alertness labels assigned to three ranges. In another embodiment, the system 100 and remote subsystem 200, in reference to FIG. 1 and FIG. 2, subsystems can be used to force the start of a conversation in situations where such a conversation would increase driver safety rather than detract from it (e.g., by stimulating a drowsy driver's attention). When a conversation is taking place, the system can be used to manage it using any of the exemplary Risk Level 116 scales and safety label assignments of FIG. 3, but when there is no conversation taking place, the system may automatically switch to measuring driver alertness using a Risk level 116 assignment as shown in FIG. 6. Nothing happens when the driver is "ALERT," but when the driver becomes "TIRED," the remote party may want to be alerted of the possibility of the driver becoming increasingly fatigued. When the Risk level 116 indicates that the driver is "DROWSY", indicating that the driver is in high danger of falling asleep, the remote party may want to force the start of a conversation with the driver to keep him awake and encourage him to stop the vehicle and rest.

Figure 7:
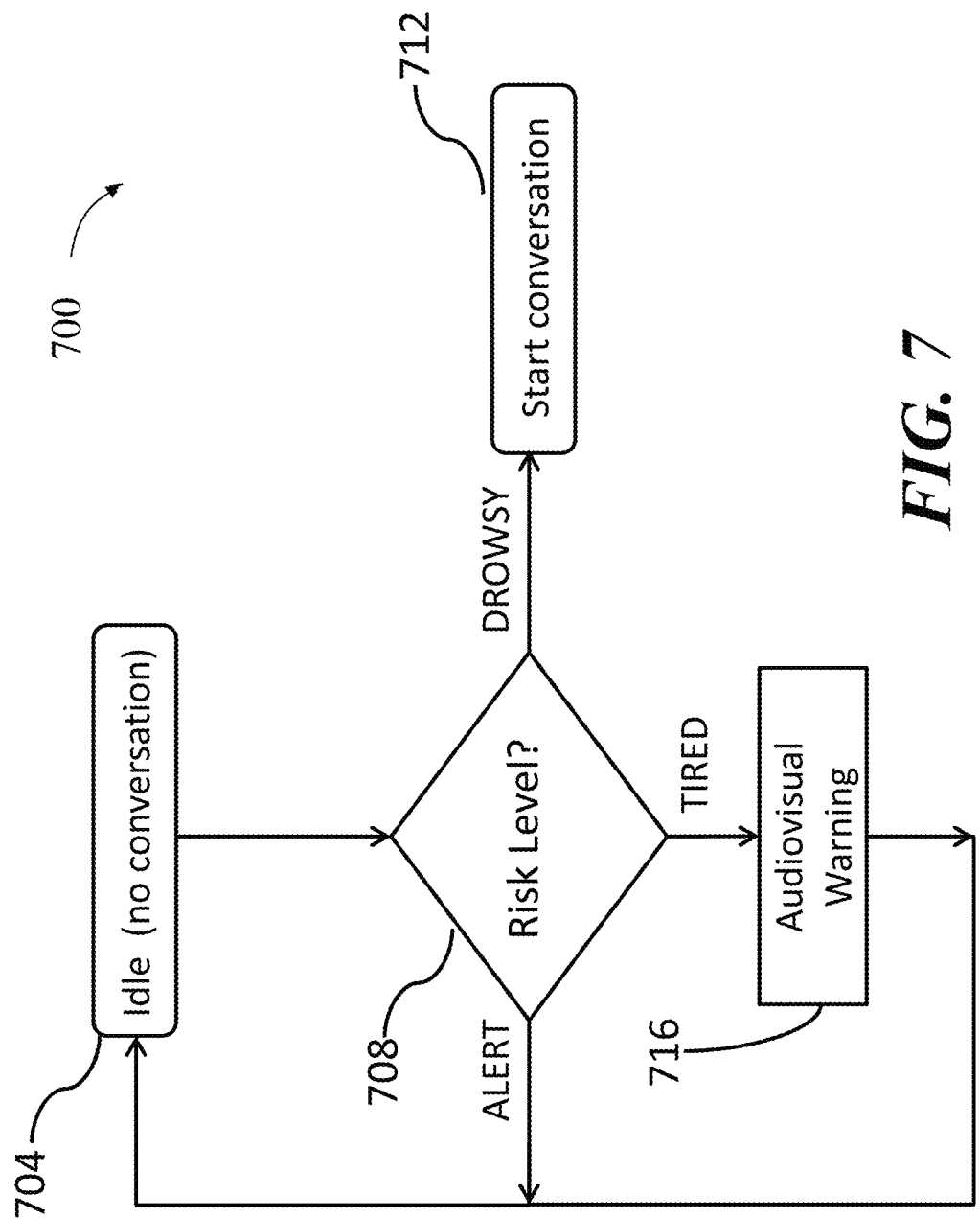
FIG. 7 is a block diagram of an embodiment of the invention illustrating how the risk level scale of FIG. 6 is a graphical representation of an illustrative risk level scale.

Referring now to FIG. 7, a block diagram of an embodiment illustrating how the Risk level 116 scale of FIG. 6 may be used to automatically force a voice conversation by a remote party. In 701 there is no conversation taking place, but the system is continuously monitoring driver alertness. While the Risk level 116 in 702 indicates that the driver is "ALERT", the system remains idle in 701. When the Risk level 116 indicates "TIRED", and audiovisual warning in 704 may be presented to the remote party and the driver but the system remains idle. But when the Risk level 116 indicates the driver is "DROWSY", then the system opens the audio channel to allow the remote party to force the start a conversation with the driver in 703, without the need for a call or the permission of the driver.

Referring now to FIG. 7, the use of this embodiment is not limited to the case of helping a driver stay awake. It may also be used by a parent, for example, to supervise a teenage driver. When the system detects patterns of unsafe driving behavior, the parent may open a conversation with the teen to encourage better behavior.

Referring now to FIG. 7, in another similar embodiment, the system may be used to detect unusual driving patterns by an aging driver with higher risk of drowsiness or dementia symptoms. Unexpected or unusual driving behaviors, such as route loops caused by "being lost," unjustified late braking, repeated high-cornering, repeated lane weaving, mistakenly swapped brake/acceleration pedal presses, and the like, can be used to notify a supervisor (nurse, family member) to "take a look" at the driver's behavior and possibly intervene by requesting the driver to pause or stop driving. Studies show that signs of dementia and Alzheimer are detected earliest behind a car wheel, before suggesting an MRI for confirmation of the diagnosis.

Figure 8:
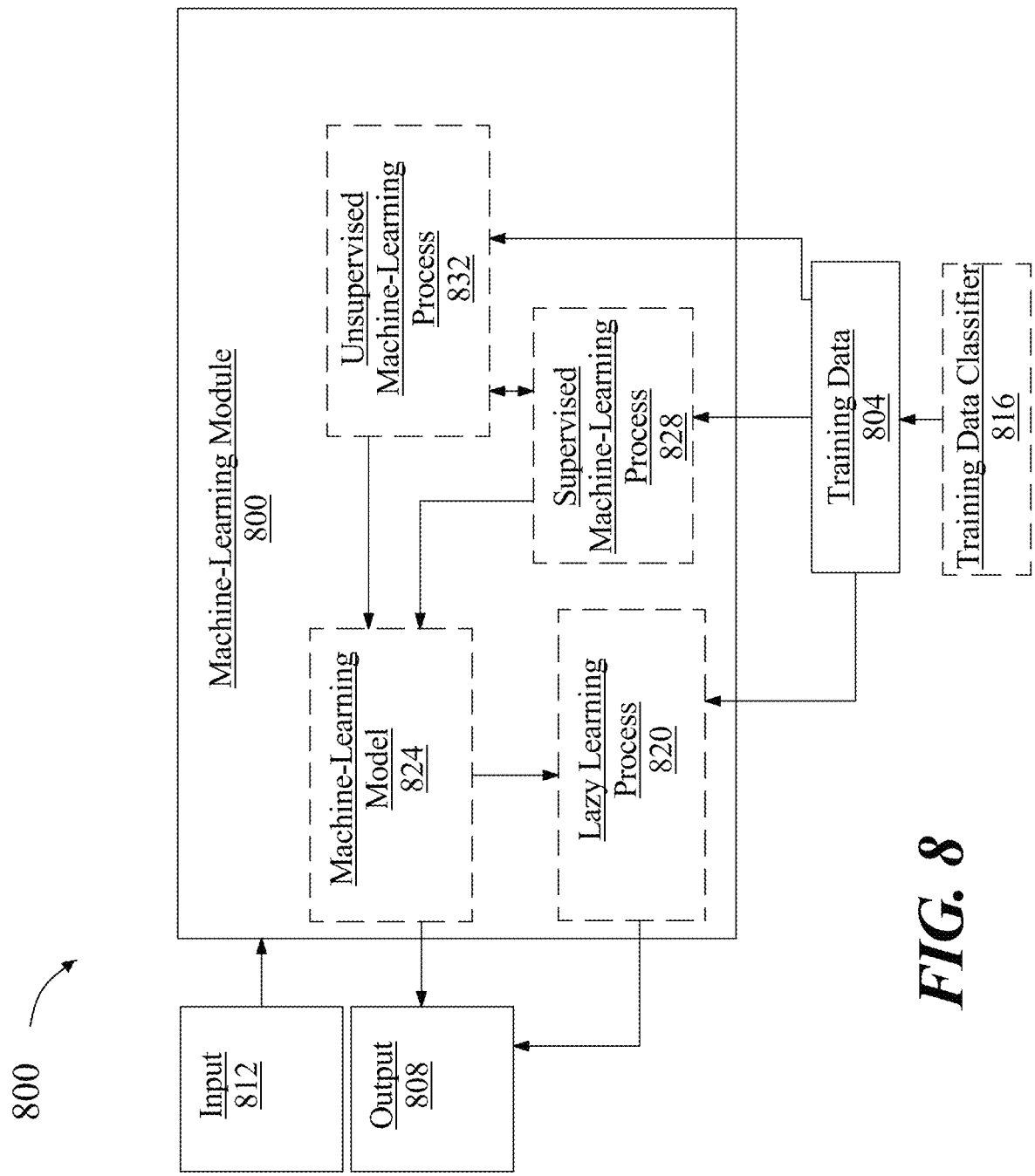
FIG. 8 is a block diagram of an exemplary embodiment of a machine-learning module.

Referring now to FIG. 8, an exemplary embodiment of a machine-learning module 800 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 804 to generate an algorithm that will be performed by a computing device/module to produce outputs 808 given data provided as inputs 812; this is in contrast to a non-machine learning software program where the commands to be executed are determined in advance by a user and written in a programming language.

Still referring to FIG. 8, "training data," as used herein, is data containing correlations that a machine-learning process may use to model relationships between two or more categories of data elements. For instance, and without limitation, training data 804 may include a plurality of data entries, each entry representing a set of data elements that were recorded, received, and/or generated together; data elements may be correlated by shared existence in a given data entry, by proximity in a given data entry, or the like. Multiple data entries in training data 804 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 804 according to various correlations; correlations may indicate causative and/or predictive links between categories of data elements, which may be modeled as relationships such as mathematical relationships by machine-learning processes as described in further detail below. Training data 804 may be formatted and/or organized by categories of data elements, for instance by associating data elements with one or more descriptors corresponding to categories of data elements. As a non-limiting example, training data 804 may include data entered in standardized forms by persons or processes, such that entry of a given data element in a given field in a form may be mapped to one or more descriptors of categories. Elements in training data 804 may be linked to descriptors of categories by tags, tokens, or other data elements; for instance, and without limitation, training data 804 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 8, training data 804 may include one or more elements that are not categorized; that is, training data 804 may not be formatted or contain descriptors for some elements of data. Machine-learning algorithms and/or other processes may sort training data 804 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 804 to be made applicable for two or more distinct machine-learning algorithms as described in further detail below. Training data 804 used by machine-learning module 800 may correlate any input data as described in this disclosure to any output data as described in this disclosure.

Further referring to FIG. 8, training data may be filtered, sorted, and/or selected using one or more supervised and/or unsupervised machine-learning processes and/or models as described in further detail below; such models may include without limitation a training data classifier 816. Training data classifier 816 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 800 may generate a classifier using a classification algorithm, defined as a processes whereby a computing device and/or any module and/or component operating thereon derives a classifier from training data 804. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 8, machine-learning module 800 may be configured to perform a lazy-learning process 820 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 804. Heuristic may include selecting some number of highest-ranking associations and/or training data 804 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 8, machine-learning processes as described in this disclosure may be used to generate machine-learning models 824. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 824 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 824 may be generated by creating an artificial neural network, such as a convolutional neural network comprising an input layer of nodes, one or more intermediate layers, and an output layer of nodes. Connections between nodes may be created via the process of "training" the network, in which elements from a training data 804 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, machine-learning algorithms may include at least a supervised machine-learning process 828. At least a supervised machine-learning process 828, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 804. Persons skilled in the art, upon reviewing the entirety of this disclosure, will be aware of various possible variations of at least a supervised machine-learning process 828 that may be used to determine relation between inputs and outputs. Supervised machine-learning processes may include classification algorithms as defined above.

Further referring to FIG. 8, machine learning processes may include at least an unsupervised machine-learning processes 832. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 8, machine-learning module 800 may be designed and configured to create a machine-learning model 824 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 8, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

For example, and still referring to FIG. 8, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Figure 9:
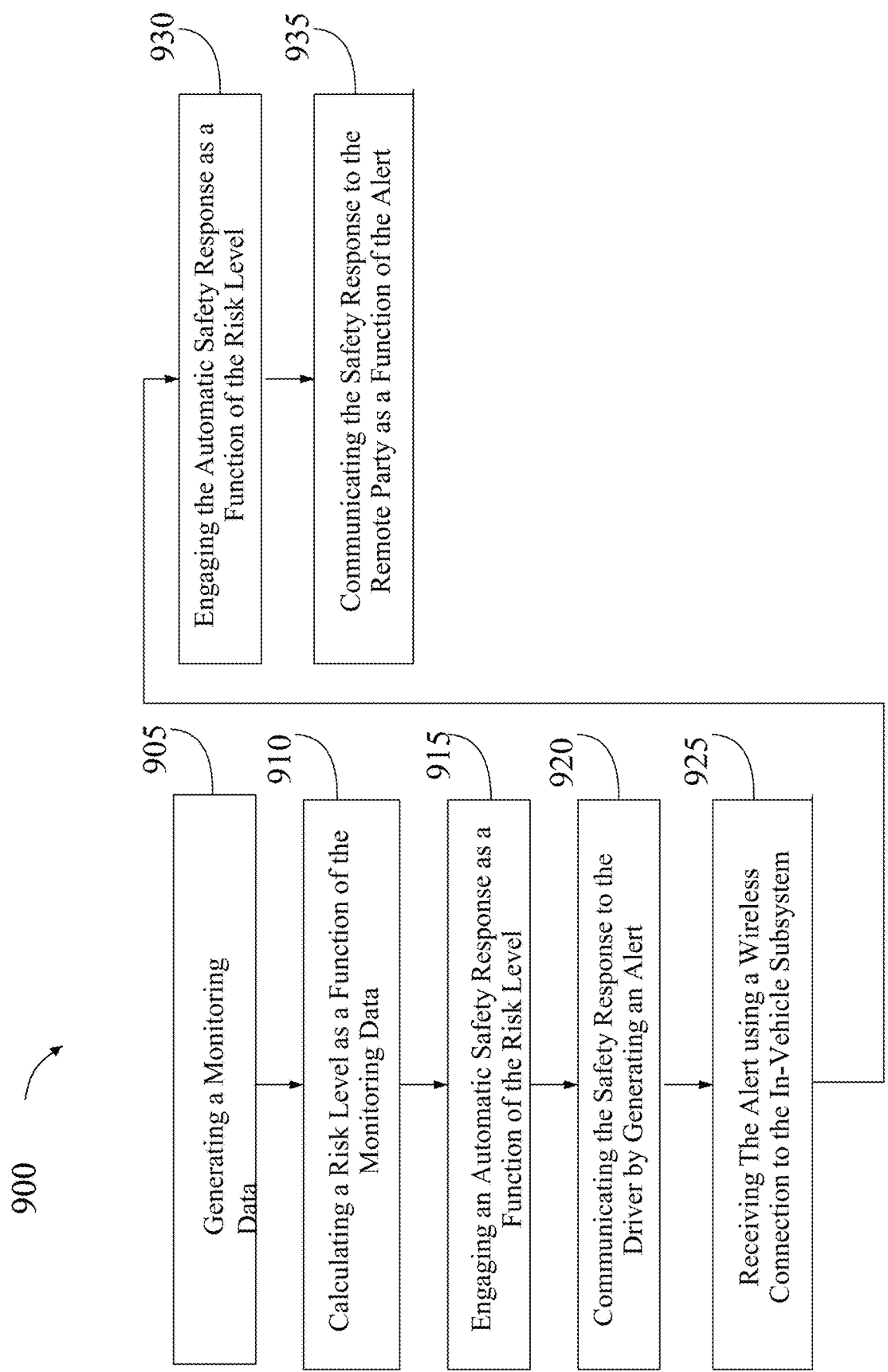
FIG. 9 is a block diagram of an exemplary method for increasing the safety of voice conversations between drivers and remote parties.

Referring now to FIG. 9, an exemplary method for increasing the safety of voice conversations between drivers and remote parties. At step 905, monitoring data is generated using a plurality of sensors. This may be implemented as described with reference to FIGS. 1-9. The monitoring data may be comprised of a geographic location of the driver, a physical condition of the driver, or a traffic condition.

At step 910, a risk level is calculated using a computing device as a function of monitoring data. This may be implemented as described with reference to FIGS. 1-9. The risk level maybe calculated using a risk machine learning model. The risk level may be evaluated on a scale of 1-10.

At step 915, an in-vehicle subsystem may engage an automatic safety response as a function of the risk level. This may be implemented as described with reference to FIGS. 1-9. The automatic safety response may include suspending or terminating a telecommunication between the in-vehicle subsystem and the remote subsystem. The automatic safety response may also include notifying emergency services At step 920, The safety response to the driver may be communicated using an in-vehicle subsystem by generating an alert. This may be implemented as described with reference to FIGS. 1-9.

At step 925, The remote subsystem receives an alert using a wireless connection from the in-vehicle subsystem. This may be implemented as described with reference to FIGS. 1-9. The alert may inform the remote party of the monitoring data as a function of the risk level.

At step 930, a remote subsystem may engage the automatic safety response as a function of the risk level. This may be implemented as described with reference to FIGS. 1-9.

At step 935, the remote subsystem may communicate the safety response to the remote party by generating the alert. This may be implemented as described with reference to FIGS. 1-9.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
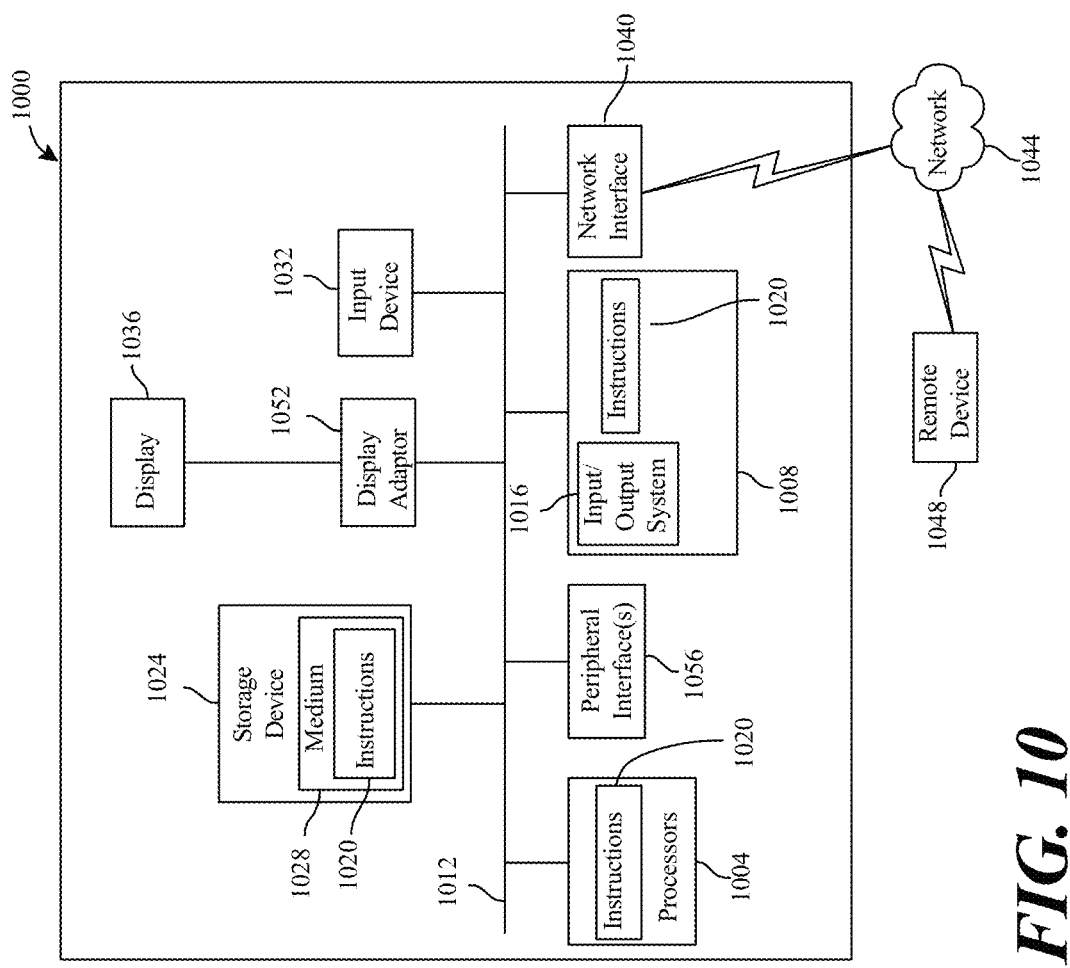
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for increasing the safety of voice conversations between drivers and remote parties by managing the voice and video communication channels between drivers and remote parties, the system comprising:
   an in-vehicle subsystem communicating wirelessly with remote subsystems accessible to the remote parties;
   a plurality of sensors, wherein the plurality of sensors are configured to generate monitoring data;
   a computing apparatus, wherein the computing apparatus is configured to:
      exchange notification information between the in-vehicle and remote subsystems;
      determine a risk level, wherein the risk level is generated as a function of the monitoring data;
      manage audio and video communications channels between the parties;
      engage an automatic safety response as a function of the risk level, wherein engaging the automatic safety response further comprises:
         comparing the risk level to a first range; and
         suspending the call based on the comparison to the first range;
      generate driver and remote party alerts as a function of the risk level; and
      resuming the call, wherein resuming the call further comprises:
         comparing the risk level to a second range; and
         resuming the call based on the comparison to the second range.

2. The system of claim 1, wherein monitoring data comprises a geographic location, time, acceleration, and speed of the driver.

3. The system of claim 1, wherein the monitoring data comprises a physical condition of the driver.

4. The system of claim 1, wherein the monitoring data comprises a traffic condition and a weather condition.

5. The system of claim 1, wherein determining the risk level comprises calculating the risk level using a risk machine learning model.

6. The system of claim 1, wherein determining the risk level further comprises:
   transmitting, to the remote subsystems, the monitoring data an estimated risk level; and
   receiving, from the remote subsystem, complementary information to refine and determine a combined risk level.

7. The system of claim 1, wherein the automatic safety response comprises suspending audio communications between the invehicle subsystem and the remote subsystems.

8. The system of claim 1, wherein the automatic safety response comprises terminating audio communications between the invehicle subsystem and the remote subsystems.

9. The system of claim 1, wherein the automatic safety response comprises notifying emergency services using traffic monitoring services.

10. The system of claim 1, wherein determining the risk level further comprises:
    transmitting, to the remote subsystems, the monitoring data, and an estimated risk level; and
    receiving, from the remote subsystem, complementary information to refine and determine a combined risk level.

11. The system of claim 1, further comprising a smartphone, wherein the smartphone is configured to generate the monitoring data, wherein generating the monitoring data comprises accessing cloud services.

12. A method for increasing the safety of voice conversations between drivers and remote parties, the method comprising:
    generating, using a plurality of sensors, monitoring data;
    using a computing apparatus to determine a risk level, wherein the risk level is generated as a function of the monitoring data;
    engaging, using the computing apparatus, an automatic safety response as a function of the risk level, wherein engaging the automatic safety response further comprises:
    comparing the risk level to a first range; and
    suspending the call based on the comparison to the first range;
    communicating, using the computing apparatus, the automatic safety response to a driver and remote parties by generating at least an alert; and
    generating a driver alert and a remote alert as a function of the risk level; and
    resuming the call, wherein resuming the call further comprises:
       comparing the risk level to a second range; and
       resuming the call based on the comparison to the second range.

13. The method of claim 12, wherein the monitoring data comprises a geographic location, time, acceleration, and speed of the driver.

14. The method of claim 12, wherein the monitoring data comprises a physical condition of the driver.

15. The method of claim 12, wherein the monitoring data comprises a traffic condition and a weather condition.

16. The method of claim 12, wherein determining the risk level comprises determining the risk level using a risk machine learning model.

17. The method of claim 12, wherein the automatic safety response comprises suspending audio communications between the invehicle subsystem and the remote subsystems.

18. The method of claim 12, wherein the automatic safety response comprises terminating audio communications between the invehicle subsystem and the remote subsystems.

19. The method of claim 12, wherein the automatic safety response comprises notifying emergency services using traffic monitoring services.

20. The method of claim 12, wherein generating monitoring data comprises generating monitoring data, using a smartphone, by accessing cloud services.

* * * * *